US012761482B2

(12) United States Patent
Hua et al.

(10) Patent No.: US 12,761,482 B2
(45) Date of Patent: Oct. 13, 2026

(54) OCCLUSION-CAPABLE OPTICAL VIEWING DEVICE AND ASSOCIATED METHOD

(71) Applicant: Arizona Board of Regents on Behalf of the University of Arizona, Tucson, AZ (US)

(72) Inventors: Hong Hua, Tucson, AZ (US); Austin Wilson, Tucson, AZ (US)

(73) Assignee: Arizona Board of Regents on Behalf of the University of Arizona, Tucson, AZ (US)

(*) Notice: Subject to any disclaimer, the term of this patent is extended or adjusted under 35 U.S.C. 154(b) by 265 days.

(21) Appl. No.: 18/726,715

(22) PCT Filed: Jan. 7, 2023

(86) PCT No.: PCT/US2023/010363
§ 371 (c)(1),
(2) Date: Jul. 3, 2024

(87) PCT Pub. No.: WO2023/133301
PCT Pub. Date: Jul. 13, 2023

(65) Prior Publication Data
US 2025/0093654 A1 Mar. 20, 2025

Related U.S. Application Data

(60) Provisional application No. 63/297,381, filed on Jan. 7, 2022.

(51) Int. Cl.
*G02B 27/01* (2006.01)
*G02B 27/30* (2006.01)

(52) U.S. Cl.
CPC ......... *G02B 27/0172* (2013.01); *G02B 27/30* (2013.01); *G02B 2027/0118* (2013.01); (Continued)

(58) Field of Classification Search
None
See application file for complete search history.

(56) References Cited

U.S. PATENT DOCUMENTS 9,436,006 B2 * 9/2016 Border .................. G02B 27/10
10,139,630 B2 * 11/2018 Yokoyama ......... G02B 27/0025
(Continued)

FOREIGN PATENT DOCUMENTS

WO 2020189302 A1 9/2020
WO 2021051068 A1 3/2021

OTHER PUBLICATIONS

Extended European Search Report for European Application No. 23737650.4, dated Dec. 2, 2025, 17 pages.
(Continued)

*Primary Examiner* — Robert E. Tallman
(74) *Attorney, Agent, or Firm* — Cozen O'Connor

(57) ABSTRACT

An occlusion-capable viewing device includes an imaging lens, a collimating lens, and a virtual display module, and between the imaging lens and the collimating lens, an image inverter, and a spatial light modulator. The imaging lens projects a first inverted image of a scene on to an entrance surface of the image inverter. The image inverter rotates the first inverted image to yield a first upright image. The spatial light modulator attenuates a first image-region of the first upright image to produce a modulated optical beam. The virtual display module includes a display device and a light combiner, which combines (i) the collimated optical beam and (ii) illumination emitted by the display device to yield an occluded image.

19 Claims, 16 Drawing Sheets

(52) U.S. Cl.
CPC ................ *G02B 2027/0132* (2013.01); *G02B 2027/0145* (2013.01); *G02B 2027/0178* (2013.01)

(56) References Cited

U.S. PATENT DOCUMENTS

| | | | | |
|---|---|---|---|---|
| 2016/0284129 | A1* | 9/2016 | Nishizawa | G06F 3/013 |
| 2018/0292655 | A1* | 10/2018 | Smithwick | G06T 19/00 |
| 2019/0004325 | A1 | 1/2019 | Connor | |
| 2019/0107722 | A1 | 4/2019 | Gao et al. | |
| 2019/0346609 | A1* | 11/2019 | Eisenfeld | G02B 6/003 |
| 2020/0371356 | A1 | 11/2020 | Khan | |
| 2021/0201769 | A1* | 7/2021 | Morris | G09G 3/32 |

OTHER PUBLICATIONS

International Search Report and Written Opinion in corresponding International Patent Application No. PCT/US23/10363, dated Apr. 25, 2023, 5 pages.

* cited by examiner

OCCLUSION-CAPABLE OPTICAL VIEWING DEVICE AND ASSOCIATED METHOD

CROSS-REFERENCE TO RELATED APPLICATIONS

This application is a US National phase Application of PCT/US2023/010363 filed Jan. 7, 2023, which claims priority to U.S. Provisional Application No. 63/297,381 filed Jan. 7, 2022, both of which are hereby incorporated in their entirety.

BACKGROUND

A conventional optical see-through head-mounted display (OST-HMD) typically relies on a single beamsplitter or a diffractive grating as an optical combiner to uniformly merge respective images of the real-world objects with virtual objects. As a result, contents rendered by a typical augmented reality (AR) display appear as an indecipherable blend of both real-world and virtual objects with the virtual objects having little or no contrast and depth information. This inability to correctly blend the objects in virtual and real worlds, referred to as mutual occlusion, in a state-of-the-art OST-HMD may lead to issues including incorrect color registration, degraded image contrast, and object placement disparity. For accurate depth perception, accurate occlusion depth cues are needed [1, 2].

Additionally, bright environments, such as outdoors, present an issue for optical see-through AR displays to correctly render color and contrast, as background light often washes out text and blends colors. This may compromise the user's interpretation of the virtual content and render color-specific interfaces useless, especially for color-dependent applications, including military and medical applications. For accurate color perception, background light must be properly occluded, such that color blending does not occur.

SUMMARY

Embodiments disclosed herein include a compact occlusion-capable optical see-through head mounted display (OCOST-HMD). The compact OCOST-HMD includes a fiber inverting array coupled with two microlens arrays (MLA). Advantages of the compact OCOST-HMD include a compact size, per-pixel mutual occlusion, a condensed form factor, a wide see-through field of view (FOV), and high image quality. An experimental demonstration of a prototype OCOST-HMD along with its performance is also described.

In a first aspect, an occlusion-capable viewing device includes an imaging lens, a collimating lens, a virtual display module, and between the imaging lens and the collimating lens, an image inverter, and a spatial light modulator. The imaging lens projects a first inverted image of a scene on to an entrance surface of the image inverter. The image inverter rotates the first inverted image to yield a first upright image. The spatial light modulator attenuates a first image-region of the first upright image to produce a modulated optical beam. The collimating lens collimates the modulated optical beam to yield a collimated optical beam. The virtual display module includes a display device and a light combiner, which combines (i) the collimated optical beam and (ii) illumination emitted by the display device to yield an occluded image.

In a second aspect, a method for producing an occluded image includes projecting an inverted image of a scene onto an entrance surface of an image inverter, rotating the inverted image to yield an upright image, attenuating an image-region of the upright image to produce a modulated optical beam, collimating the modulated optical beam to yield a collimated optical beam, and combining (i) the collimated optical beam and (ii) an illumination emitted by a display device to yield the occluded image.

DETAILED DESCRIPTION OF THE EMBODIMENTS

To properly address issues described above including a bright background, a light blocking technique, often referred to as mutual occlusion, may be used, such that (i) an opaque virtual object appears to completely opaque and occlude a real object located behind it, and (ii) a real-world object naturally occludes the view of a virtual object located behind it. To achieve mutual occlusion in an optical see-through head-mounted display (OST-HMD), two categories of solutions exist. These include (i) a direct ray blocking occlusion, which blocks rays from a see-through scene without focusing them [3-9], and (ii) a per-pixel modulation occlusion, in which an objective optics focuses a see-through view at an intermediate image plane to selectively modulate a real-world scene pixel-by-pixel using an occlusion mask [10-22].

While each category of solutions has its unique advantages, per-pixel modulation occlusion is preferred for environment versatility, light efficiency, diffraction artifacts and accuracy of the occlusion mask(s).

Figure 1:
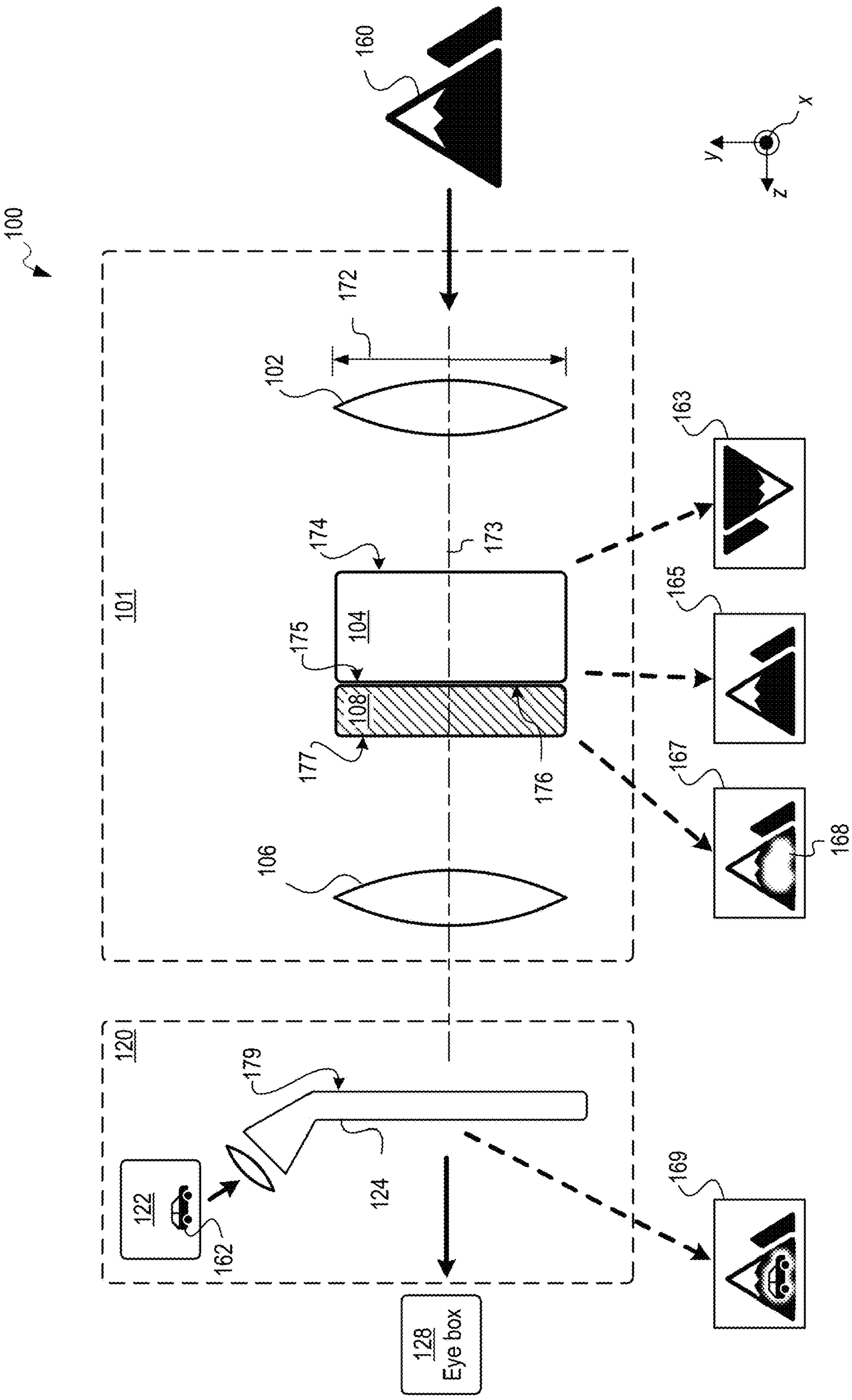
FIG. 1 is a cross-sectional diagram of an occlusion-capable viewing device, in an embodiment.

FIG. 1 is a cross-sectional diagram of an occlusion-capable viewing device 100. Viewing device 100 may be attached to an eyewear frame to yield an occlusion-capable OST-HMD (OCOST-HMD). Examples of the eyewear frame include a visor, eyeglasses, data glasses, a helmet, and a headset. FIG. 1 depicts a virtual object 162 to be combined with a real-world scene, or scene 160. Viewing device 100 includes an occlusion module 101 and a virtual display module (VDM) 120. Occlusion module 101 includes an imaging lens 102, an image inverter 104, a spatial light modulator (SLM) 108, and a collimating lens 106. SLM 108 may include a liquid crystal display.

Occlusion module 101 has a similar optics layout as that of a refracting telescope. For example, image inverter 104 functions as an array of relay lenses in a refracting telescope to rotate the inverted image formed by imaging lens 102 to an upright image. In embodiments, image inverter 104 is a fiber faceplate inverter (FFI), which includes a twisted bundle of optical fibers to rotate an image from an image entrance surface 174 to an image exit surface 176. In such embodiments, the length of optics required for the function of the array of relay lenses to rotate an image is significantly reduced. Additional advantages of using an FFI over a typical relay lens system include a higher speed, compactness, absence of vignetting and lens aberrations, and wide control of image rotation angle.

Imaging lens 102 has an optical axis 173 along the z-axis, and a diameter 172 in the x-y plane. In an embodiment, diameter 172 is 2.5 millimeters, which matches the average diameter of a pupil of human eye. Imaging lens 102 projects an inverted image 163 of scene 160 onto image entrance surface 174 of imaging inverter 104. In embodiments, image inverter 104 is positioned such that its center axis, which is an axis parallel to the z-axis about which the image rotates, is coaxial with optical axis 173. Image inverter 104 rotates inverted image 163 to yield an upright image 165 at exit surface 176.

SLM 108 has an entrance surface 175 and an exit surface 177. Entrance surface 175 of SLM 108 is parallel to exit surface 176 of image inverter 104. FIG. 1 shows SLM 108 located at exit surface 176 of image inverter 104. However, SLM 108 may be placed at either entrance surface 174 or exit surface 176. Additionally, SLM 108 may be spatially separated from image inverter 104 along the z-axis. In embodiments, as shown in FIG. 1, entrance surface 175 is located against exit surface 176 without any separation, which may reduce optical distortion of viewing device 100.

By changing opacity of its pixels, SLM 108 selectively blocks certain light fields from upright image 165. The light fields being blocked are referred to as an occlusion mask or a mask hereinafter and have the same shape as virtual object 162 and are located at the intended location of virtual object 162 in upright image 165. As such, SLM 108 has a pixel resolution sufficiently high to render a mask of virtual object 162 in upright image 165. In other words, an occlusion mask is rendered on SLM 108 to attenuate an image-region 168 of upright image 165 to be occluded by virtual object 162 rendered through VDM 120. The exiting image of SLM 108 is a masked image 167. Hereinafter, masked image 167 is referred to as a modulated optical beam.

Collimating lens 106 and imaging lens 102 may be coaxial. Collimating lens 106 collimates the modulated optical beam, or masked image 167, and projects a collimated optical beam to VDM 120. VDM 120 includes a light combiner 124. In embodiments, VDM also includes a display device 122, which is optically coupled to light combiner 124, such that virtual object 162 displayed by display device 122 is projected into light combiner 124. Light combiner 124 is located between collimating lens 106 and an eye box 128. VDM 120 may be formed with a freeform eyepiece and a see-through (e.g., transparent) optical combiner. VDM 120 may also include a substrate-guided optical combiner (e.g., a diffractive waveguide combiner) or a geometric lightguide combiner. For example, light combiner 124 shown in FIG. 1 is a geometric lightguide that is arranged such that an object side surface 179 is parallel to the x-y plane. Light combiner 124 combines (i) the collimated optical beam and (ii) illumination emitted by display device 122 to yield an occluded image. For example, light combiner 124 combines masked image 167 with virtual object 162 to yield an occluded image 169.

Figure 2:
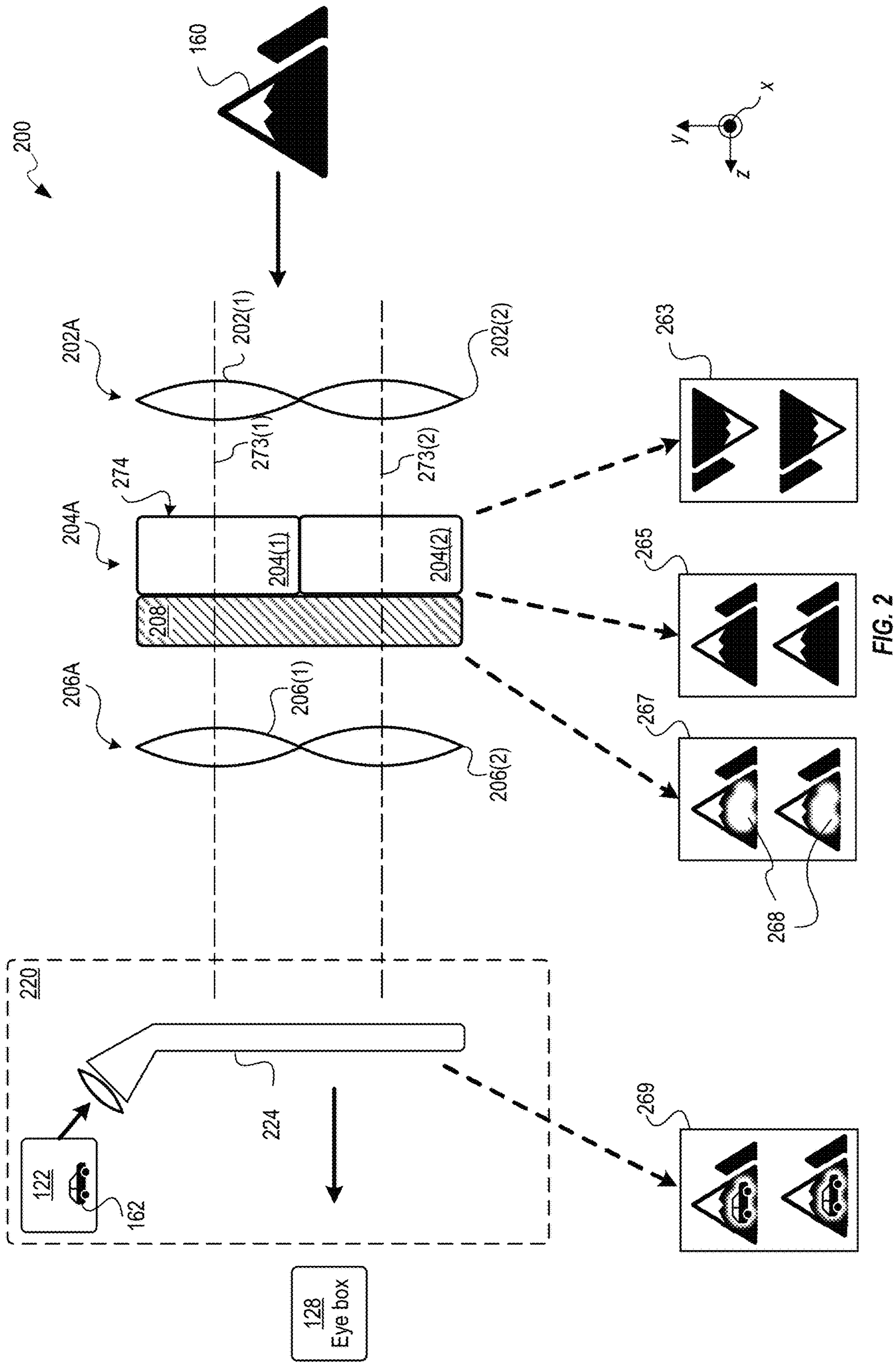
FIG. 2 is a cross-sectional diagram of an occlusion-capable viewing device with two optics units of FIG. 1.

Viewing device 100 may be extended to include two or more viewing devices. FIG. 2 is a cross-sectional diagram of an occlusion-capable viewing device 200 with two optics units of FIG. 1, where an optics unit of FIG. 1 includes imaging lens 102, image inverter 104, and collimating lens 106. Viewing device 200 includes a second optics unit: an imaging lens 102(2), an image inverter 104(2), and a collimating lens 106(2), in addition to a first optics unit of viewing device 100: an imaging lens 102(1), an image inverter 104(1), and a collimating lens 106(1). The second optics unit is laterally displaced from and parallel to the first optics unit, such that each optics unit has an optical axis: an optical axis 273(1) for the first optics unit and an optical axis 273(2) for the second optics unit. Optical axes 273(1) and 273(2) are parallel to each other. Imaging lenses 202(1) and 202(2) are collectively referred to as an imaging lens array 202A. Image inverters 204(1) and 204(2) are collectively referred to as an image inverter array 204A, which has an entrance surface 274. Collimating lenses 206(1) and 206(2) are collectively referred to as a collimating lens array 206A. Viewing device 200 also includes an SLM 208 and VDM 220, which are respective examples of SLM 108 and VDM 120. VDM 220 includes a light combiner 224, which is an example of light combiner 124. Each of light combiner 224 and SLM 208 is sized to fit both the first and second optics units in the x-y plane.

Viewing device 200 functions the same way as viewing device 100. However, the second optics unit has a slightly shifted perspective of scene 160 that depends on the displacement of the second imaging lens from imaging lens 102. Imaging lens array 202A projects an inverted image 263 comprising two perspective views of scene 160 on an entrance surface 274 of image inverter array 204A. Hereinafter, an individual image that corresponds to one optics unit is referred to as an elemental image. For example, inverted image 263 includes two inverted elemental images, each of which is projected by a corresponding imaging lens 202(1) or 202(2). Image inverter array 204A rotates each of the inverted elemental images in inverted image 263 to yield an upright image 265 comprising two upright elemental images. SLM 208 generates an occlusion mask 268 for the shape and size of virtual object 162 for each elemental image in upright image 265. Exiting SLM 208 is a masked image 267. After collimating each masked elemental image by collimating lens array 206A, light combiner 224 combines masked image 267 with virtual object 162 to yield an occluded image 269.

Figure 3:
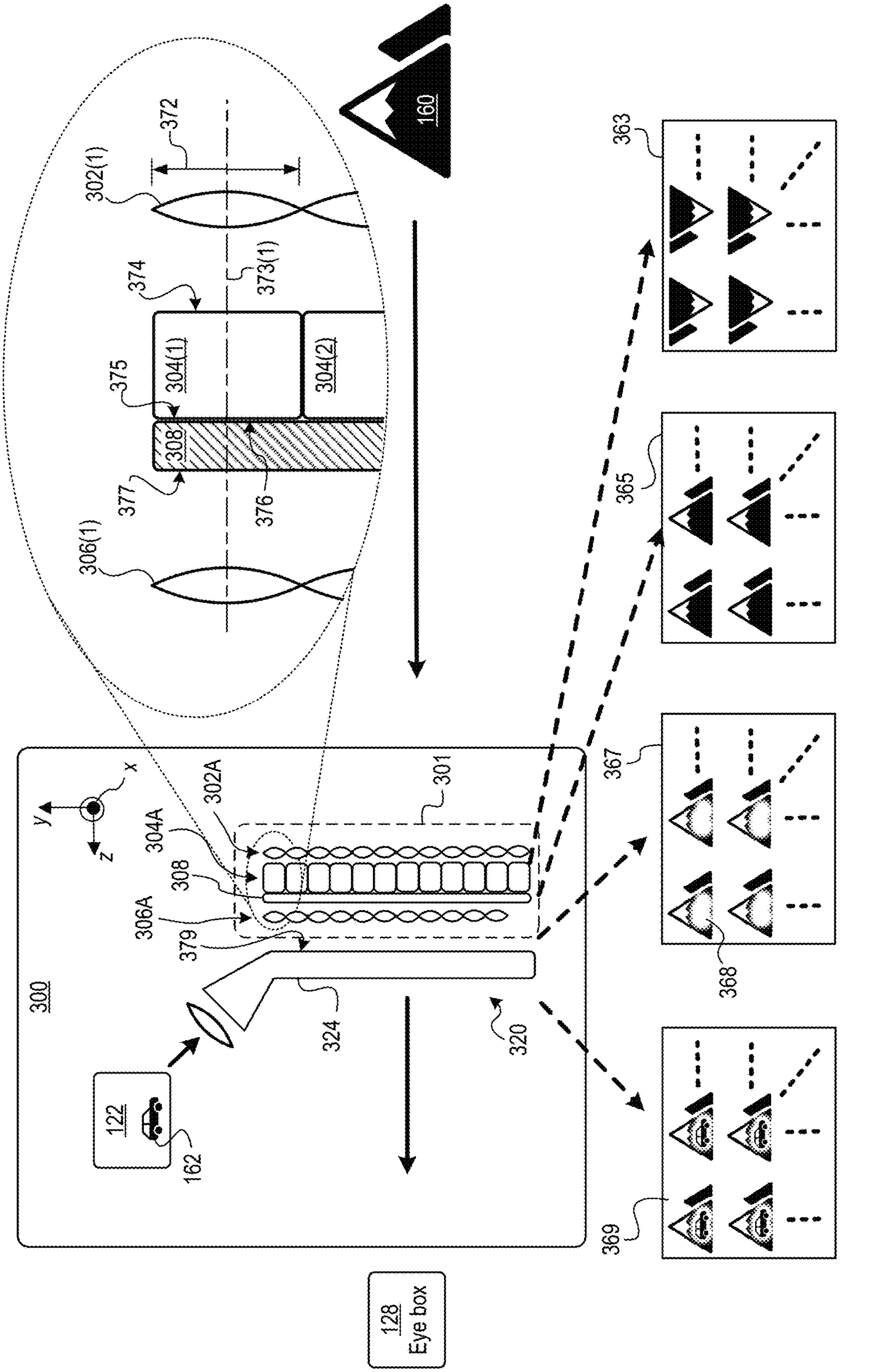
FIG. 3 is a cross-sectional diagram of an occlusion-capable viewing device with multiple optics units of FIG. 1.

The example may be expanded to further include three or more optics units as shown in FIG. 3. FIG. 3 is a cross-sectional diagram of an occlusion-capable viewing device 300 with more than two optics units of FIG. 1. Viewing device 300 includes a two-dimensional array, MXN in the x-y plane, of optics units FIG. 3 depicts virtual object 162, that is to be combined with scene 160 in an occluded image. Viewing device 300 includes an occlusion module 301 and a virtual display module (VDM) 320, which are respective examples of occlusion module 101 an VDM 120. Occlusion module 301 includes microlens arrays (MLA) 302A and 306A, a fiber faceplate inverter array (FFIA) 304A, and a transmissive spatial light modulator (SLM) 308. MLA 302A is an M×N array of microlenses 302 (*i*), where i is a positive integer that addresses each microlens of the M×N array. Each microlens 302 (*i*) is an example of imaging lens 102. The M×N array of microlenses 302 (*i*) is arranged on a plane parallel to the x-y plane as M horizontal (x) and N vertical (y) microlenses, where at least one of M and N is greater than one. Each microlens 302 (*i*) has an optical axis 373 (*i*) along the z-axis and a diameter 372. In embodiments, diameter 372 is 2.5 millimeters and matches an average diameter of a pupil of viewer's eye.

FFIA 304A includes an array of fiber faceplate inverters (FFIs). Each FFI is an example of image inverter 104. In embodiments, each FFI of FFIA 304A is aligned with a corresponding microlens of MLA 302A, such that each FFI is centered with an optical axis of the corresponding microlens. For example, a FFI 304(1) may have a center axis that is coaxial with an optical axis 373(1) of microlens 302(1). Consequently, FFIA 304A includes an M×N array of FFIs. Additionally, in some embodiments, each FFI 304 (*i*) has similar size in the x-y plane as microlens 302 (*i*) Each FFI 304 (*i*) has an entrance surface 374 and an exit surface 376. Entrance surface 374 may be parallel to an image plane of the corresponding microlens 302 (*i*).

In embodiments, each FFI 304 (*i*) is formed of a dense array of twisted optical fibers arranged to rotate an incoming image by 180. By using such an optical fiber bundle, the optical system saves a significant amount of space along the z-axis, as explained previously in reference to image inverter 104 of viewing device 100, FIG. 1.

SLM 308 has an entrance surface 375 and an exit surface 377. SLM 308 is an example of SLM 108. SLM 308 is sized to fit FFIA 304A in the x-y plane. Entrance surface 375 of SLM 308 is parallel to exit surface 376 of FFIA 304A. In embodiments, MLA 306A has the same size array of microlenses as MLA 302A, such that MLA 306A includes an M×N array of microlenses 306 (*i*), each of which is an example of collimating lens 106 of FIG. 1. MLA 306A is arranged on a plane parallel to the x-y plane. Each microlens 306 (*i*) may share the same optical axis as the corresponding microlens 302 (*i*). For example, microlens 306(1) is aligned such that its optical axis is coaxial with optical axis 373 of microlens 302(1).

VDM 320 includes a light combiner 324, which is an example of light combiner 124. VDM 320 may also include display device 122, which is optically coupled to light combiner 324, such that display device 122 displays virtual object 162, which is projected into light combiner 324. Light combiner 324 is located between MLA 306A and eye box 128. VDM 320 may include a freeform eyepiece and a see-through optical combiner. VDM 320 may also include a substrate-guided optical combiner (e.g., a diffractive waveguide combiner) or a geometric lightguide combiner. For example, light combiner 324 may be a geometric lightguide that is arranged such that an object side surface 379 is parallel to the x-y plane.

Viewing device 300 functions the same way as viewing devices 100 and 200. However, each additional optics unit has a slightly shifted perspective of scene 160 that depends on the displacement of the additional imaging lens (e.g., microlens 302 (*i*)) from neighboring imaging lenses of MLA 302A. MLA 302A projects an inverted image 363 comprising inverted elemental images, each projected by microlens 302 (*i*) on to an entrance surface of corresponding FFI 304 (*i*), each inverted elemental image is of scene 160. Each FFI 304 (*i*) rotates the inverted elemental image projected thereon to an upright elemental image, yielding an upright image 365 at exit surface 376. SLM 308 generates an occlusion mask 368 for the shape and size of virtual object 162 for each upright elemental image in upright image 365. Exiting SLM 308 is a masked image 367 comprising masked elemental images. Each masked elemental image of masked image 367 is then collimated for viewing by microlens 306 (*i*) of MLA 306A to yield a collimated masked elemental image. Light combiner 324 combines each collimated masked elemental image with virtual object 162 to yield an occluded elemental image. The resulting image is an occluded image 369, which includes a two-dimensional array of occluded elemental images. The pupil of a viewer's eye acts as the aperture stop of the optical system, selectively choosing a perspective view corresponding to one occluded elemental image.

VDM 320 may have a different form or additional elements to improve image quality of virtual object 162. For example, VDM 320 may be implemented by (i) incorporating a freeform eyepiece with a see-through combiner as in [23], [24], (ii) utilizing a substrate-guided optical combiner such as a diffractive waveguide combiner in [25], or (iii) utilizing a geometric lightguide combiner in [26], [27]. While VDM 320 utilizes a geometric lightguide (i.e., light combiner 324) for compactness, the lightguide may be any shape. An example of an alternate VDM is shown in FIG. 4.

Figure 4:
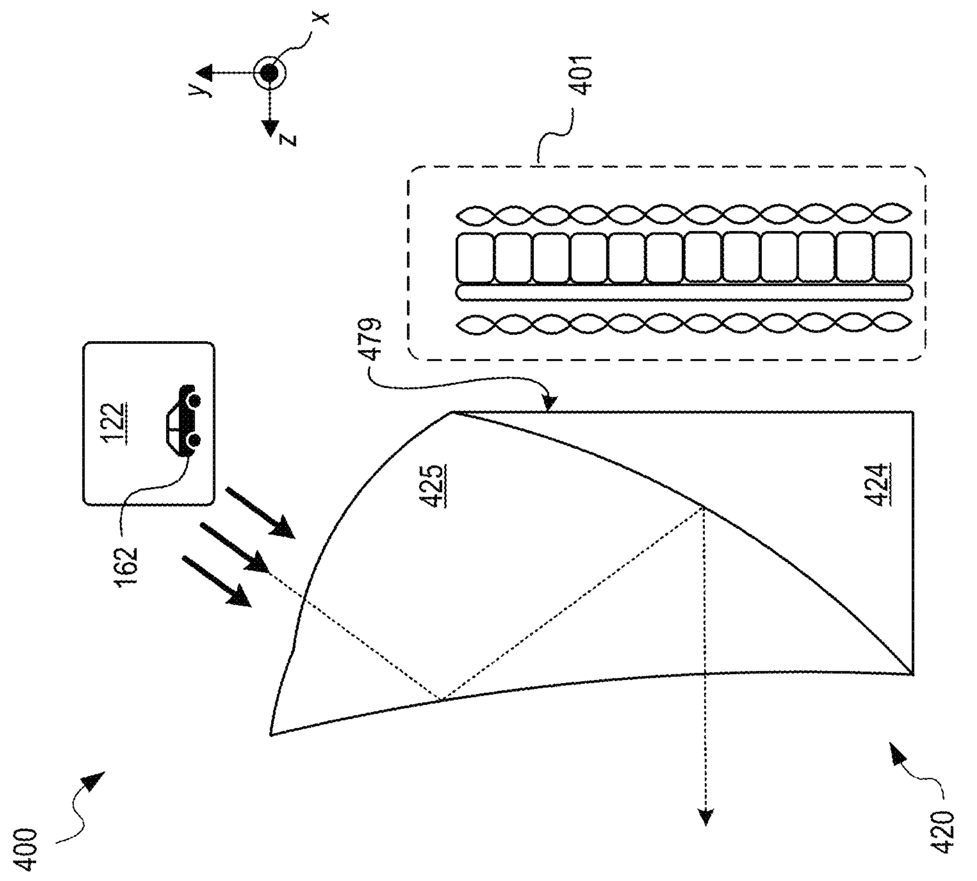
FIG. 4 is a cross-sectional diagram of an occlusion-capable viewing device with an alternate embodiment of virtual display module.

FIG. 4 is a cross-sectional diagram of an occlusion-capable viewing device 400 showing an alternate embodiment of virtual display module. Viewing device 400 is an example of viewing device 100. Viewing device 400 includes an occlusion module 401 and a VDM 420. Occlusion module 401 may be any occlusion module of viewing devices 100, 200, and 300. VDM 420 includes a freeform light combiner 424, which is an example of light combiner 324. Freeform light combiner 424 has an entrance surface 479 that may be parallel to the x-y plane. Freeform light combiner 424, as with light combiner 324, provides see-through image included the occluded image. VDM 420 also includes a freeform prism 425. Freeform light combiner 424 and freeform prism 425 may be of any form to increase field of view (FOV) and image quality of virtual object 162. VDM 420 may also have alternate designs or additional elements without departing from the scope thereof. For example, light combiner 424 may be a diffractive waveguide or may include a holographic optical element [23].

Figure 5:
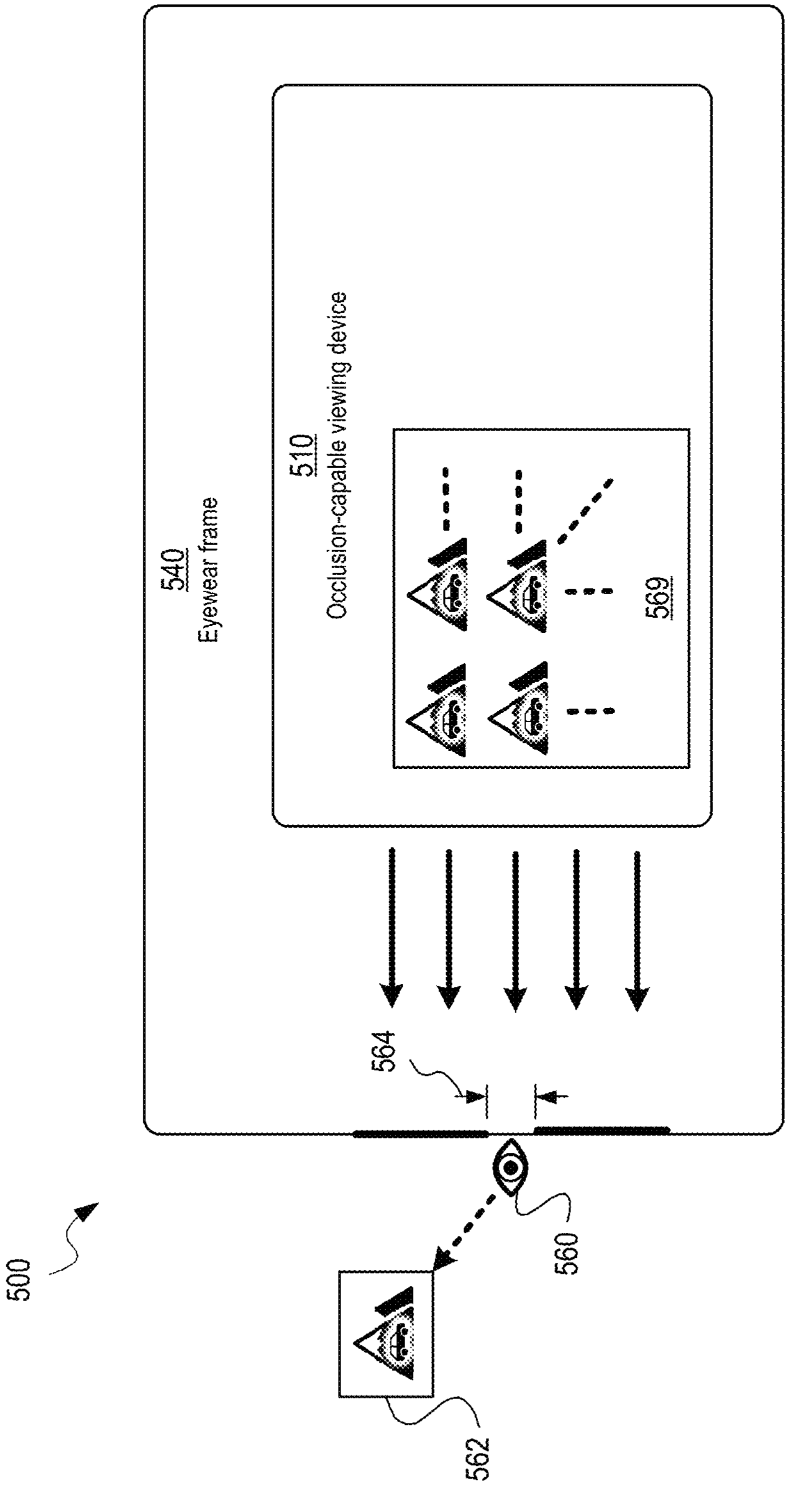
FIG. 5 is a block diagram of an occlusion-capable head-mounted display, in an embodiment.

FIG. 5 is a block diagram of an occlusion-capable head-mounted display (HMD) 500. HMD 500 includes an eyewear frame 540 and an occlusion-capable viewing device 510. Eyewear frame 540 may be any one of a visor, eyeglasses, data glasses, a helmet, and a headset. Viewing device 510 is attached to eyewear frame 540 and may be any one of viewing devices 100, 200, 300, and 400. In the example of FIG. 5, viewing device 510 is an example of viewing device 300 and includes an occluded image 569, which is an example of occluded image 369 and comprises a two-dimensional array of occluded elemental images. FIG. 5 depicts a viewer's eye 560 having a pupil diameter 564.

Pupil diameter functions as an aperture stop for HMD 500, such that viewer's eye 560 images, of the collimated occluded elemental images, one occluded elemental image 562.

Figure 6:
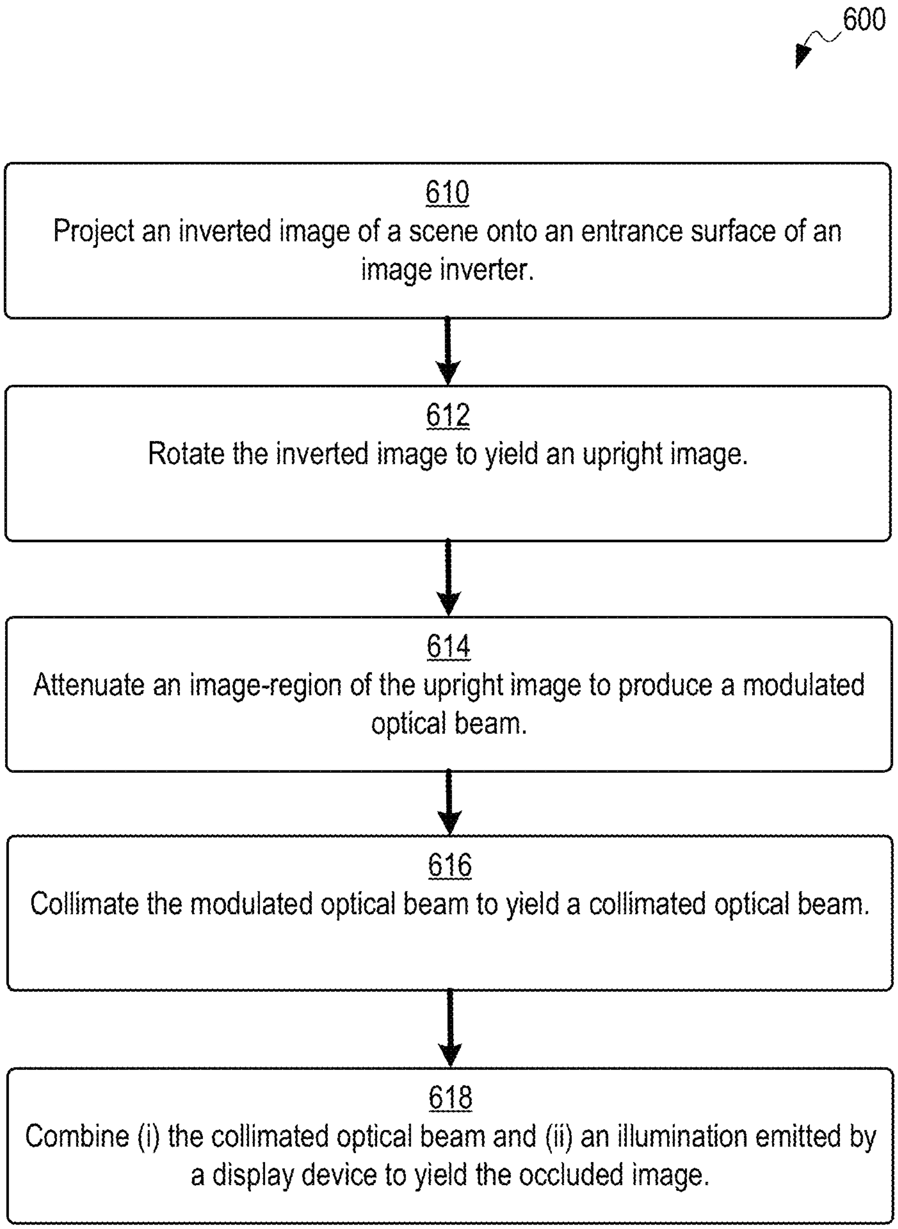
FIG. 6 is a flowchart illustrating a method of generating an occluded image using a viewing device, which may be any one of viewing devices of FIGS. 1-4, in an embodiment.

FIG. 6 is a flowchart illustrating a method 600 of generating an occluded image using a viewing device, which may be any one of viewing devices of FIGS. 1-4. Method 600 includes steps 610, 612, 614, 616, and 618. Step 610 includes projecting an inverted image of a scene onto an entrance surface of an image inverter. In an example of step 610, imaging lens 102 projects inverted image 163 of scene 160 on entrance surface 174 of image inverter 104.

Step 612 includes rotating the inverted image to yield an upright image. In an example of step 612, image inverter 104 rotates inverted image 163 to upright image 165 at exit surface 176. Step 614 includes attenuating an image-region of the upright image to produce a modulated optical beam. In an example of step 614, SLM 108 attenuates image-region 168, corresponding to a mask of virtual object 162, and produces masked image 167.

Step 616 includes collimating the modulated optical beam to yield a collimated optical beam. In an example of step 616, collimating lens 106 collimates masked image 167 and projects the collimated image onto light combiner 124.

Step 618 includes combining (i) the collimated optical beam and (ii) an illumination emitted by a display device to yield the occluded image. In an example of step 618, light combiner 124 combines masked image 167 from collimating lens 106 with virtual object 162 projected into light combiner 124 from display device 122, and yields occluded image 169.

Figure 7:
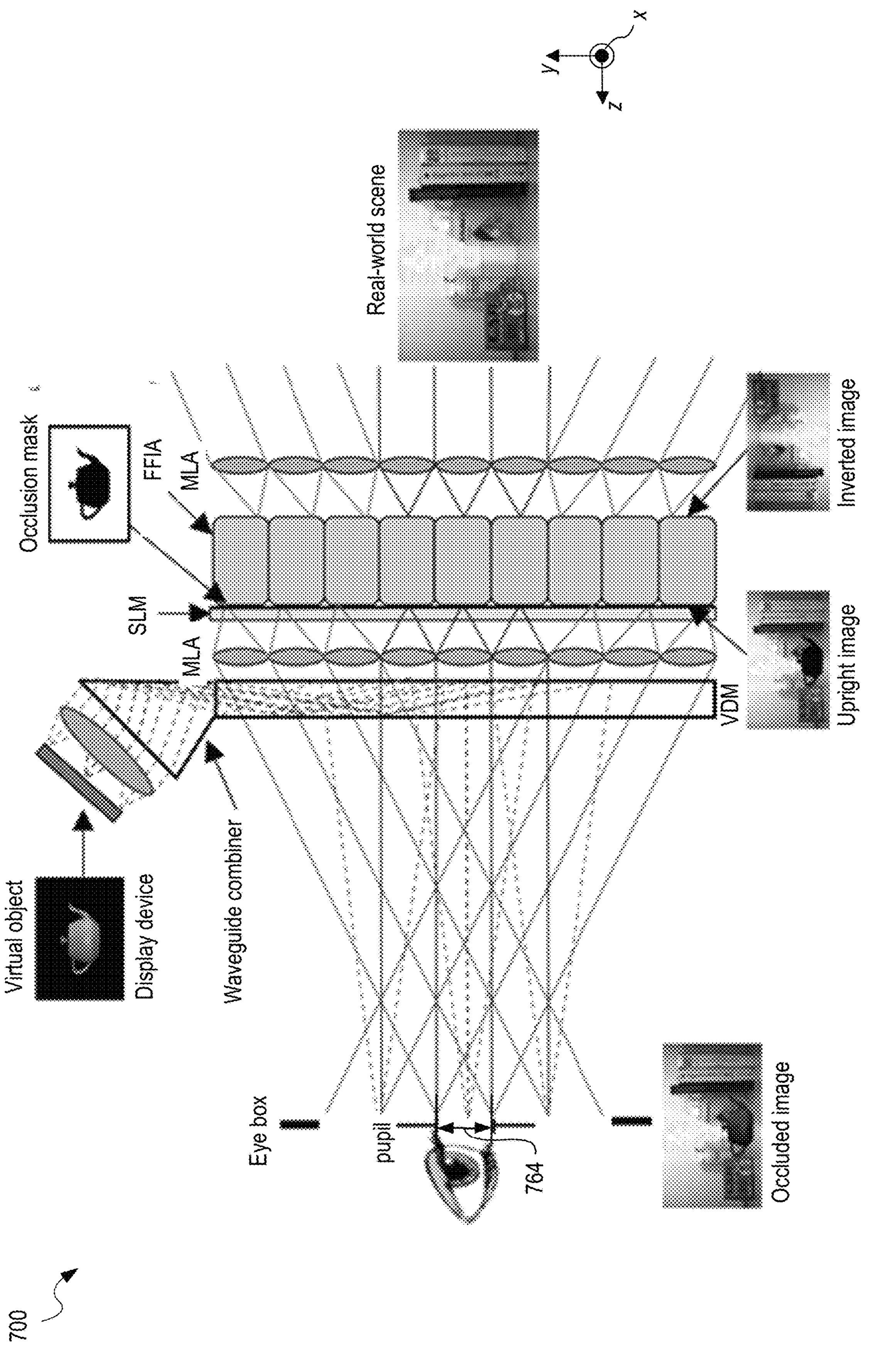
FIG. 7 shows selected ray tracing in an optical system that includes the occlusion-capable viewing device of FIG. 3.

In the following paragraphs, some of the design considerations are described. These considerations are meant to be guidelines and do not limit the scope herein. For clarity in the following description, FIG. 7 shows selected ray tracing in an optical system 700 that includes occlusion-capable viewing device 300 of FIG. 3. FIG. 7 depicts a pupil diameter 764 of a viewer, which functions as an aperture stop of optical system 700. In an unfolded layout, the SLM-modulated see-through path is similar to a typical refracting telescope construction that includes an objective array, relay, and eyepiece array, which are equivalent to microlens 302 (*i*) of MLA 302A, FFI 304 (*i*) of FFIA 304A, and microlens 306 (*i*) of MLA 306A, respectively. However, unlike such an optical layout using an optical relay, FFI used for image inverter 104 or FFIA 304A transfers and rotates an inverted image via thousands of sub-micro light rods essentially decoupling the optical path of the objective and eyepiece lenses. The optical performance then becomes additive of both the objective and eyepiece lens array, aberrations accumulated by the first lens (e.g., imaging lens 102) are transferred from the entrance to the exit surfaces of the FFIA 304A with a 180-degree rotation, the second lens (e.g., collimating lens 106) can no longer compensate for these aberrations. This decoupling of the objective and eyepiece, although challenging for image quality, leads to a relationship between the F-number, F/#, of a single microlens and the angular see-through FOV of the overall system (e.g., viewing device 300) expressed as:

$$FOV = 2\tan^{-1}\left(\frac{1}{2F/\#}\right) \tag{1}$$

where the entrance pupil (e.g., diameter 764) of the optical system is given by the lens diameter (e.g., diameter 372. FIG. 3), and the focal length determines the optical tube length of the overall optical system. For clarity in explanation, the focal lengths of MLA 302A and MLA 306A are considered equal hereinafter.

Figure 8:
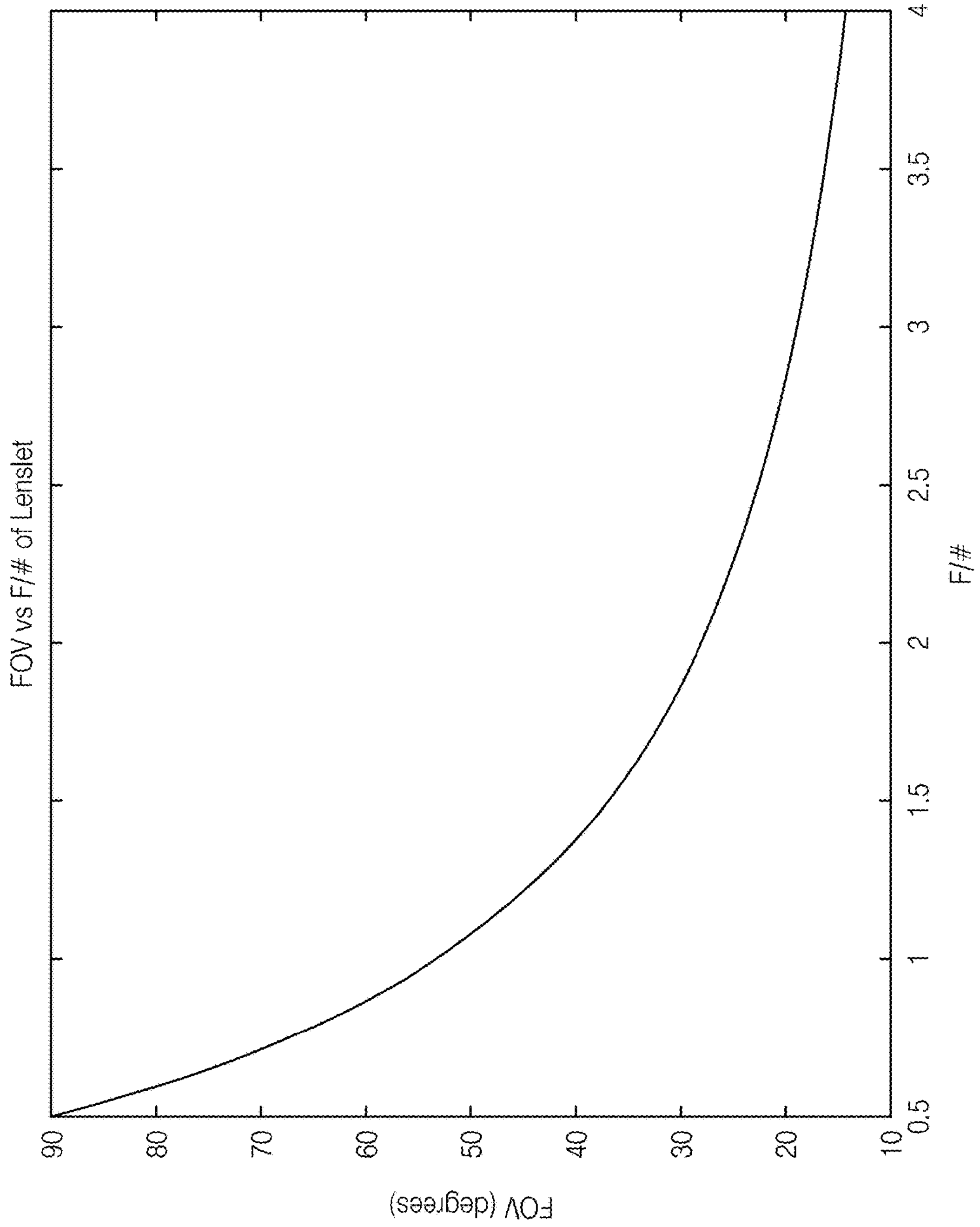
FIG. 8 is a plot illustrating field of view of occlusion-capable viewing device as a function of the F-number of a collimating lens of the device.

FIG. 8 is a plot illustrating field of view of occlusion-capable viewing device as a function of the F-number of a collimating lens of the device. As the plot indicates, for an F/# of 1.5, the system FOV is roughly 36 degrees, offering a significantly larger optical see-through FOV than the conventional light field architecture.

In addition to the optical design of the MLAs, choice of parameters for the SLM placed at either the entrance or exit surfaces of the FFIA may be crucial in several optical properties of the overall system. For example, when entrance surface 375 (exit surface 377) of SLM 308 is aligned with exist surface 376 (entrance surface 374) of FFIA 304A without any distance between the two surfaces 375 and 376 (surfaces 377 and 374), any distortion in the mask caused by a gap between the two surfaces may be avoided. In practice, however, a typical SLM, such as a transparent LCD, is constructed with a cover glass that leads to a gap between a pixel layer of SLM and FFIA. This inevitable gap introduces a defocusing blur that varies with the cover glass thickness and the F/# of the MLA, where the defocusing blur is measured as the pixel size limit of the SLM.

Figure 9A:
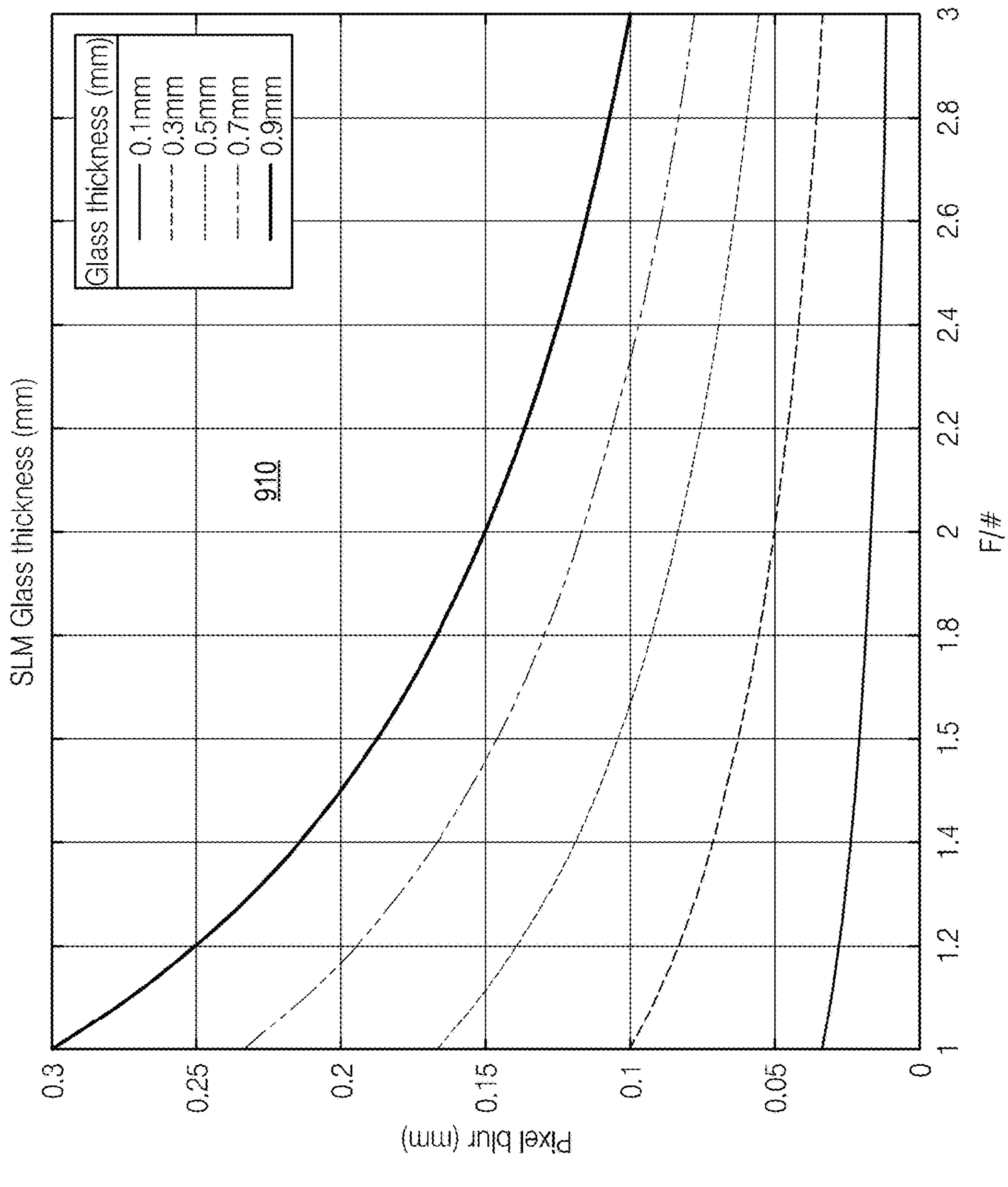
FIG. 9A is a plot of defocusing blur as a function of microlens F-number for a selection of cover glass thicknesses of a spatial light modulator of FIG. 3.

FIG. 9A is a plot 910 of defocusing blur as a function of microlens F-number for a selection of cover glass thicknesses of a spatial light modulator of FIG. 3. The selection of cover glass thicknesses includes 0.1, 0.3, 0.5, 0.7, and 0.9 mm. Plot 910 shows that when a cover glass has a thickness of 0.7 mm, the amount of defocusing blur varies from approximately 80 μm up to nearly 250 μm as the MLA F/# decreases from 3 to 1. Plot 910 shows that a thinner cover glass leads to smaller amount of defocusing blur. The amount of allowable of defocusing blur depends on the pixel size of the SLM which may also determine the resolution of the viewing device. For example, when an SLM includes a cover glass having a thickness of 0.5 mm, and MLA has an F/# of 1.5, the resulting defocusing blur is approximately 120 μm, which is a resolution limit of the viewing device. Additionally, for defocusing blur to be better than 80 μm, the pixel plane of SLM needs to be placed no more than 0.3 mm away from FFIA or a neighboring intermediate image plane. In other words, the cover glass thickness of the SLM needs to be 0.3 mm or smaller.

Figure 9B:
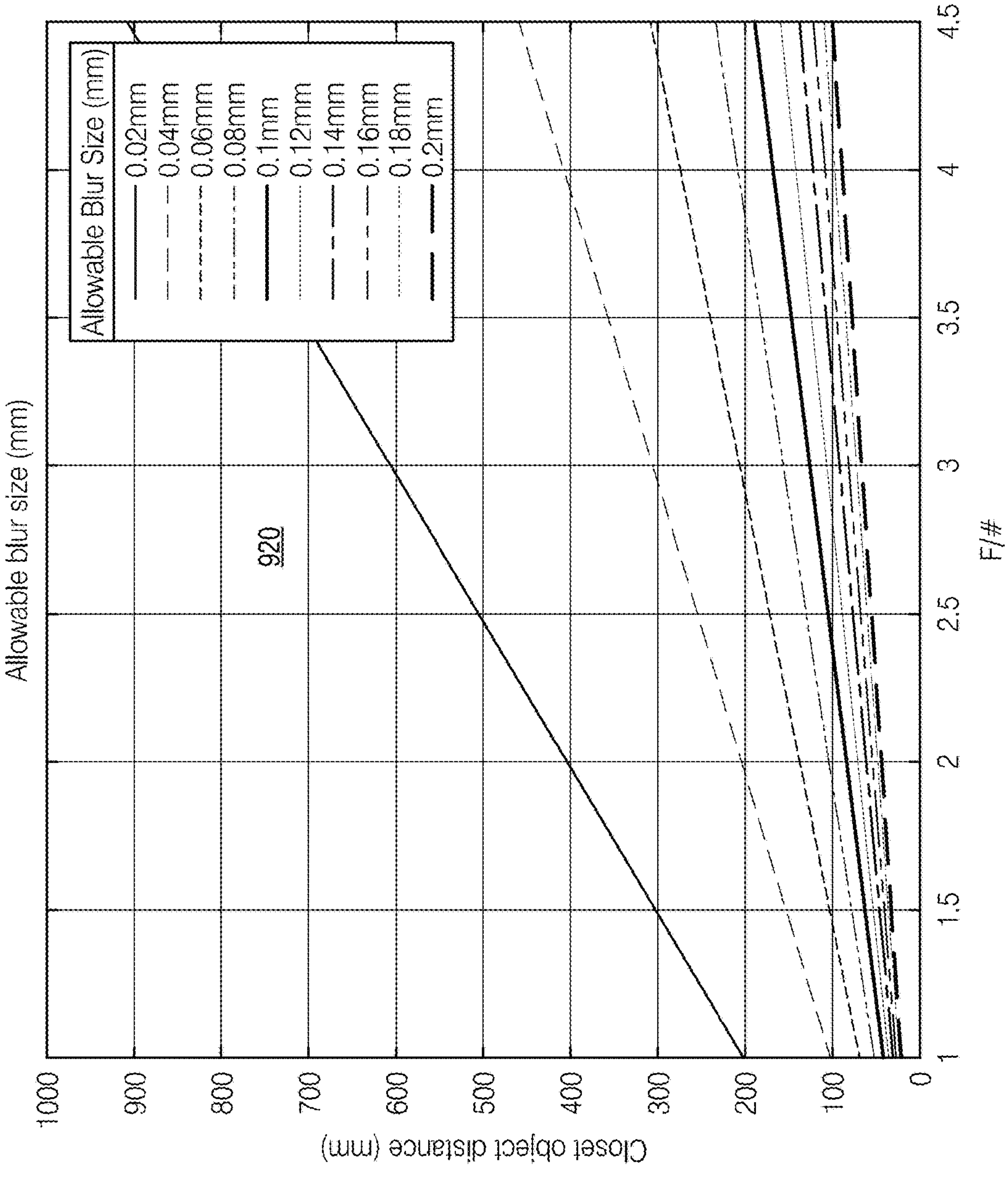
FIG. 9B is a plot illustrating a relationship between the closest object distance and the F-number of MLA in the optical system of FIG. 7.

The amount of defocusing blur induced by the cover glass affects not only the resolution of the viewing device but also the distance to the closest objects that can be rendered with sharp occlusion masks. FIG. 9B is a plot 920 illustrating a relationship between the closest object distance and the F-number of MLA for each allowable defocusing blur from 20 up to 200 μm at an increment of 20 μm in optical system 700 of FIG. 7. The closest object distance refers to the near depth of field conjugate to the occlusion mask. For example, as shown in plot 920, for an MLA F/# of 1.5 and SLM pixel size of 60 μm, the closest object with an in-focus occlusion mask is up to 100 mm.

Figure 10:
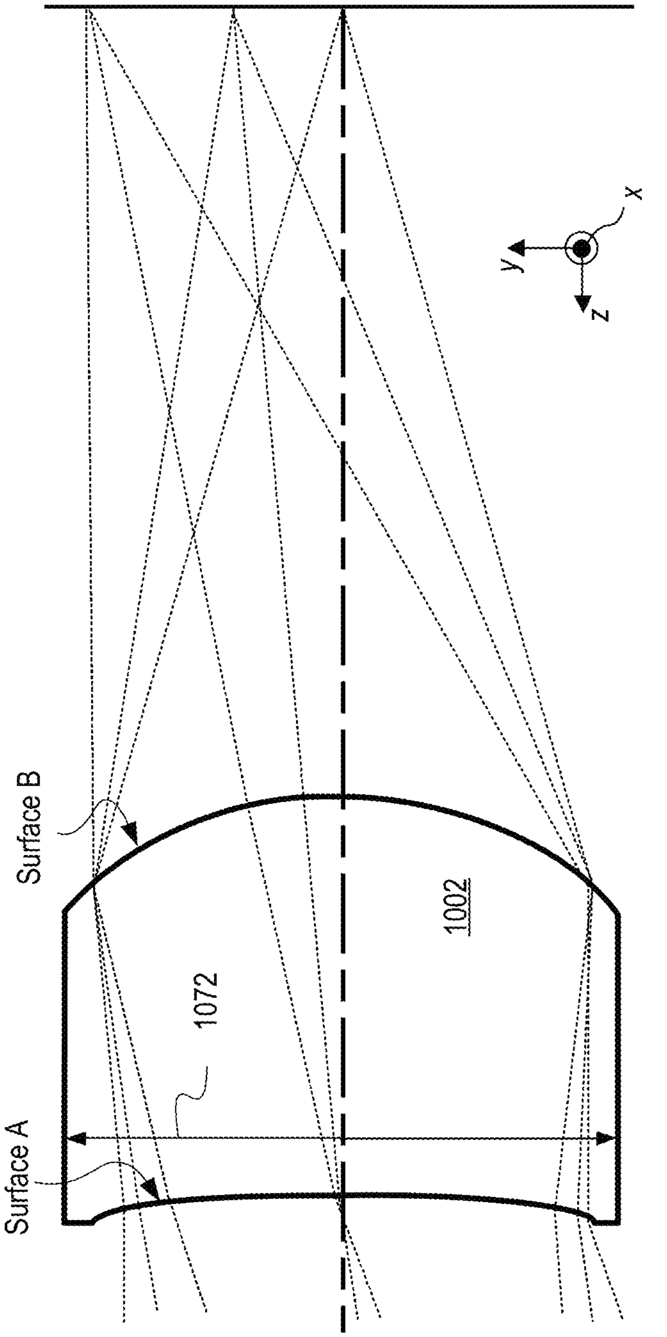
FIG. 10 shows a cross-sectional layout of a microlens of a microlens array of FIG. 3, in an embodiment.

For parameters relating to MLAs. FIG. 10 shows a cross-sectional layout of a microlens 1002 of a microlens array of FIG. 3. Microlens 1002 has a diameter 1072, which may be 2.5 mm to approximately match that of the entrance pupil of a viewer's eye, which may be between two and four millimeters in moderate to bright environments. Table 1 below shows optics parameters for microlens 1002, which is shown as a double aspheric lens in an MXN lens array, such as MLA 302A or MLA 306A. FIG. 10 depicts a first surface, surface B, and a second surface, surface A. The optical paths shown in FIG. 10 are traced for a microlens with the entrance pupil being located at surface B of the microlens. The term "asphere" in Table 1 refers to an aspherical surface which may be represented by the following equation:

$$z = \frac{cr^2}{1+\sqrt{1-(1+k)c^2r^2}} + Ar^4 + Br^6 + Cr^8 + Dr^{10} + Er^{12} \tag{2}$$

where z is a sag of the surface measured along the z-axis of a local x, y, z coordinate system, c is a vertex curvature, r is a radial distance, and k is a conic constant. Y radius in Tables 1 and 2 refers to the vertex radius of the surface and is equivalent to the reciprocal of the vertex curvature, c. Parameters A through E are the 4th, 6th, 8th, 10th and 12th order deformation coefficients, respectively. Table 2 below shows aspheric coefficients resulting from an optimization process (e.g., to minimize optical aberrations and maximize optical performance including image resolution) for the aspheric surfaces A and B.

TABLE 1

| Surface | Surface type | Y radius | Thickness | Material | Refract mode |
|---|---|---|---|---|---|
| A | asphere | 170.5602 | 2 | PMMA | Refract |
| B | asphere | −1.98228 | 3.75 | | Refract |

TABLE 2

| | Surface A (FIG. 7) | Surface B (FIG. 7) |
|---|---|---|
| Y Radius | 170.56.02 | −1.98228 |
| Conic Constant (k) | −99 | −0.25907 |
| 4th Order Coefficient (A) | −0.02778 | −0.00383 |
| 6th Order Coefficient (B) | −0.02703 | 0.002255 |
| 8th Order Coefficient (C) | 0.028499 | −0.00365 |
| 10th Order Coefficient (D) | −0.02033 | 0.001595 |
| 12th Order Coefficient (E) | 0.00403 | −0.00026 |

Figure 11:
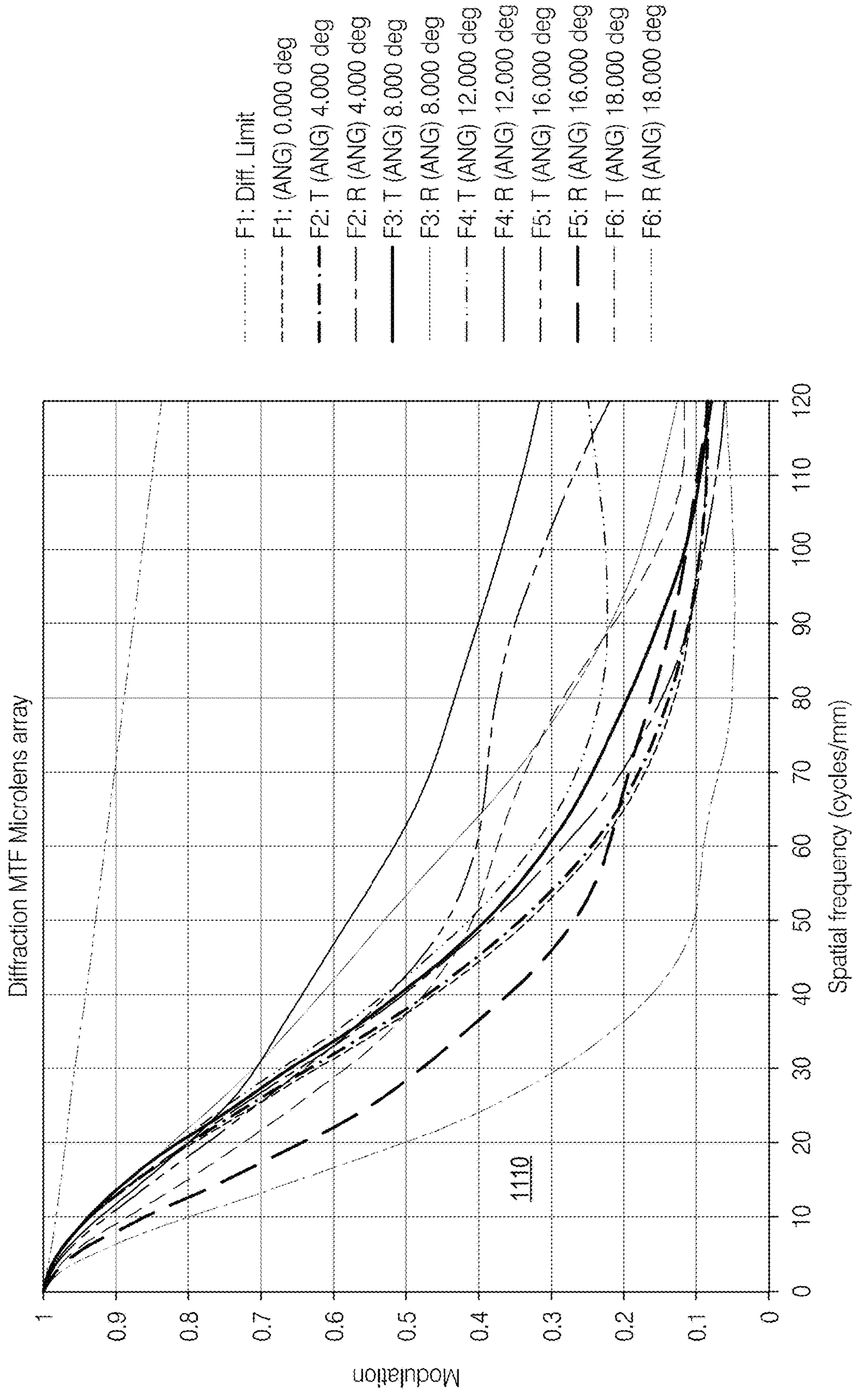
FIG. 11 is a plot showing the modulation transfer function for a selection of weighted fields of an array comprising the microlenses of FIG. 10.

FIG. 11 is a plot 1110 showing polychromatic modulation transfer function (MTF) for a selection of simulated weighted fields of an array comprising microlenses 1002 of FIG. 10. Transverse and radial fields are evaluated with a 2.5 mm pupil diameter and a cutoff spatial frequency of 110 cycles/mm for the microlens array. Plot 1110 shows simulated see-though optical performance that maintains an average modulation of 10% at the cutoff frequency of 110 cycles/mm.

Experimental Demonstration

Figure 12:
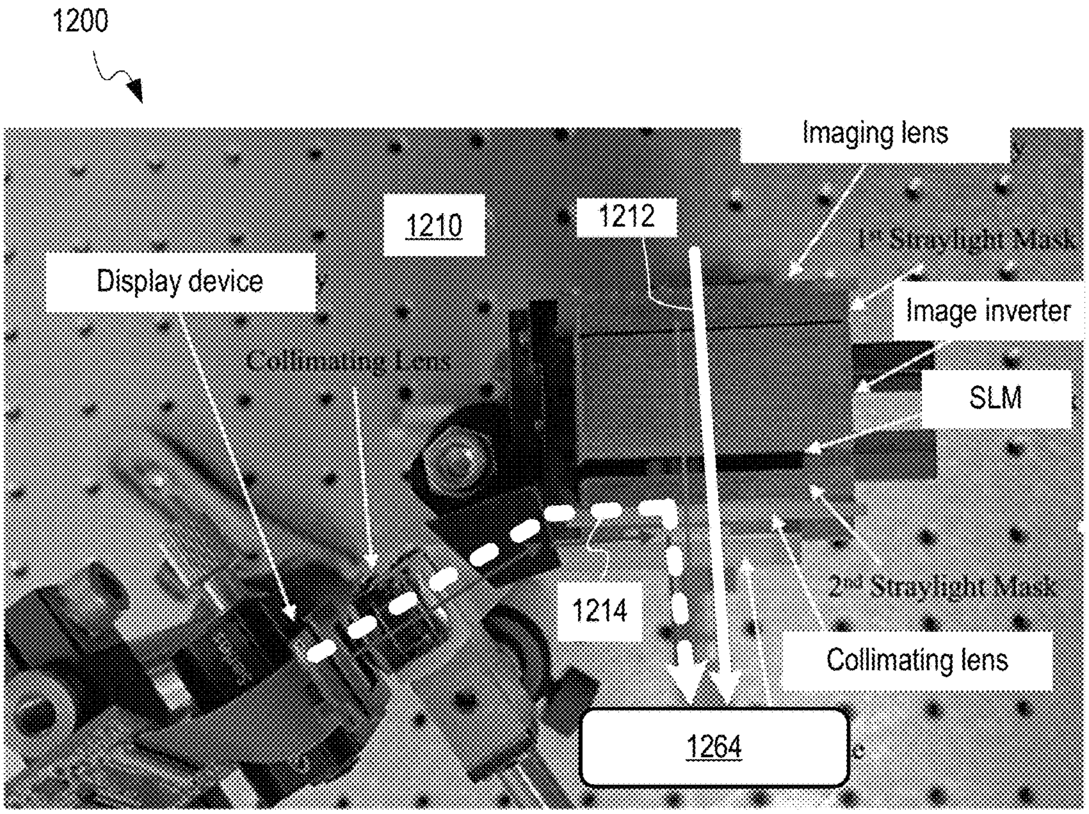
FIG. 12 shows a monocular benchtop prototype of an occlusion-capable viewing device, which is an embodiment of the viewing device of FIG. 1.
Figure 12:
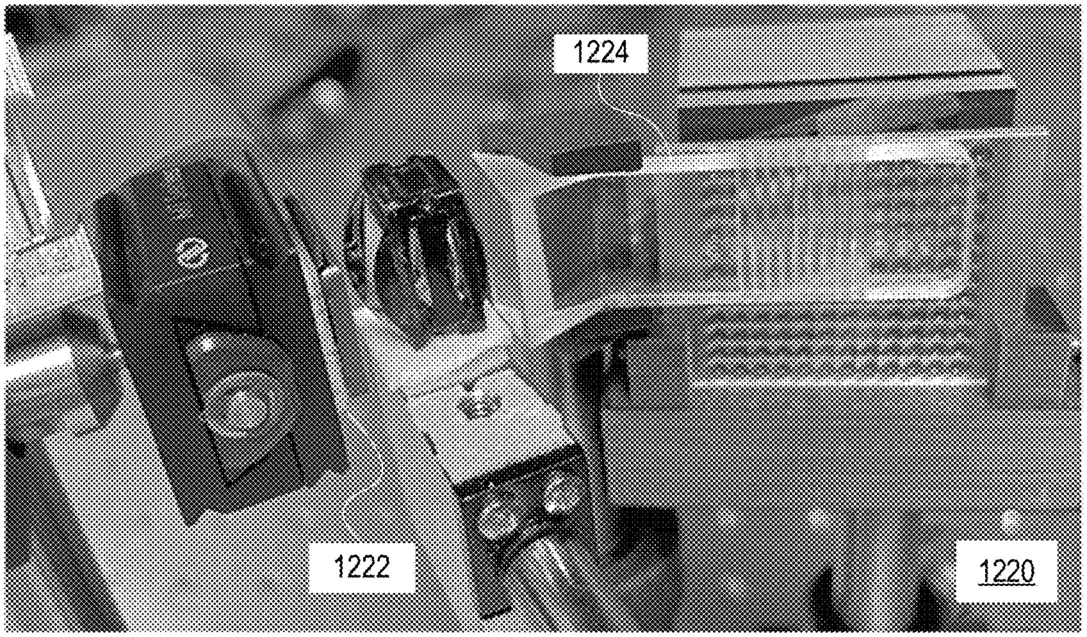

FIG. 12 shows a monocular benchtop prototype of an occlusion-capable viewing device 1200, which is an embodiment of viewing device 100 of FIG. 1. FIG. 12 includes pictures 1210 and 1220. Picture 1210 is a top-view of viewing device 1200, and picture 1220 is a close-up view of a VDM. Picture 1210 depicts light paths 1212 and 1214, which are light paths of a real-world scene and a virtual scene, respectively. Viewing device 1200 includes a 0.5" microdisplay 1222, which is an example of display device 122 of FIG. 1, having an 8 μm pixel pitch and a Nyquist frequency of 63 cycles/mm. Viewing device 1200 also includes an image combiner 1224, which is an example of light combiner 124 and is a geometric lightguide. By using a geometric lightguide instead of a freeform prism (e.g., freeform prism 425), the optical form factor becomes more compact and allows the exit pupil of the system to be located roughly on the surface of the microlens array limiting the number of microlenses needed to see the full FOV to essentially one, similar to viewing device 100, FIG. 1. A printed transparency mask was used to render a static occlusion mask rather than a programmable SLM and placed at the intermediate pupil location. A camera sensor 1264 along with a 16 mm-focal-length lens, was inserted at the exit pupil to replace the viewer's eye (e.g., viewer's eye 560 in FIG. 5) for capturing the occluded image.

To evaluate viewing device 1200, a 1951 USAF resolution test chart is used as a target (i.e., real-world scene) to measure the spatial and angular resolutions of the modulated see-though light path 1212. The target is positioned 30 cm away from the exit pupil, where camera sensor 1264 is located to capture a see-through image of the target to determine the smallest resolvable group in the resolution test chart.

Figure 13:
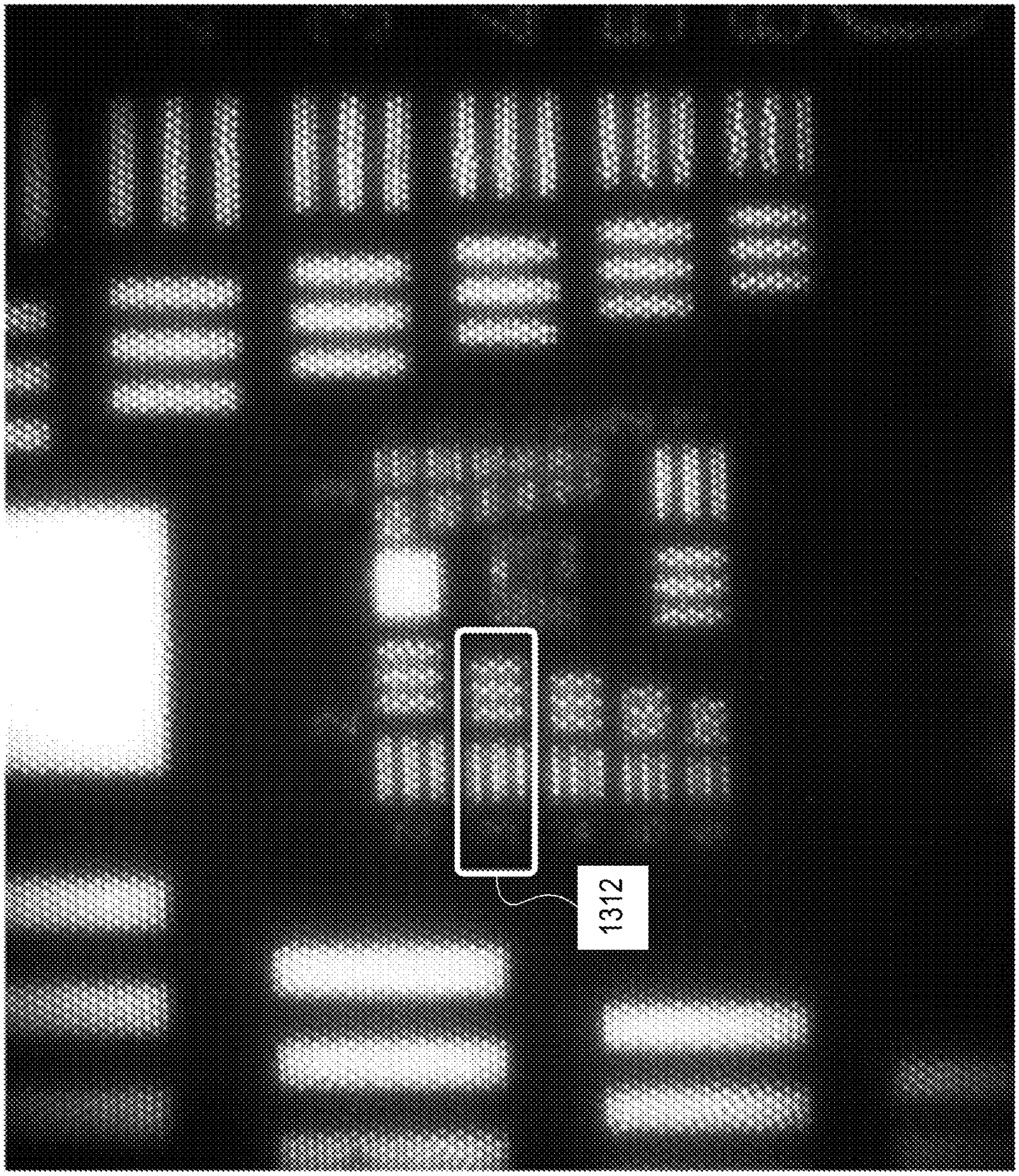
FIG. 13 is a captured image of a resolution test chart using the occlusion-capable viewing device of FIG. 12.

FIG. 13 is a captured image of the 1951 USAF resolution test chart using viewing device 1200 of FIG. 12. FIG. 13 depicts a highlighted area 1312, which shows the highest resolvable spatial frequency. A contrast ratio above 0.1 was determined to be resolvable. Highlighted area 1312 shows Group 2 Element 3 for horizontal and vertical lines, corresponding to 5.04 cycles/mm, resulting in an angular resolution of 26 cycles/degree. The captured image of the resolution test chart indicates that the resolvability of the see-through path through the occlusion module, viewing device 1200, is nearly intact to a human viewer.

A qualitative evaluation of the occlusion capability of the light field viewing device 1200 benchtop prototype is also performed. A monitor to provide a real-world scene is placed 60 cm away from viewing device 1200 displaying the University of Arizona logo. The monitor was set for a bright simulated background image (300 to 500 cd/m$^2$), while the virtual scene was a three-dimensional image of a basketball.

Figure 14:
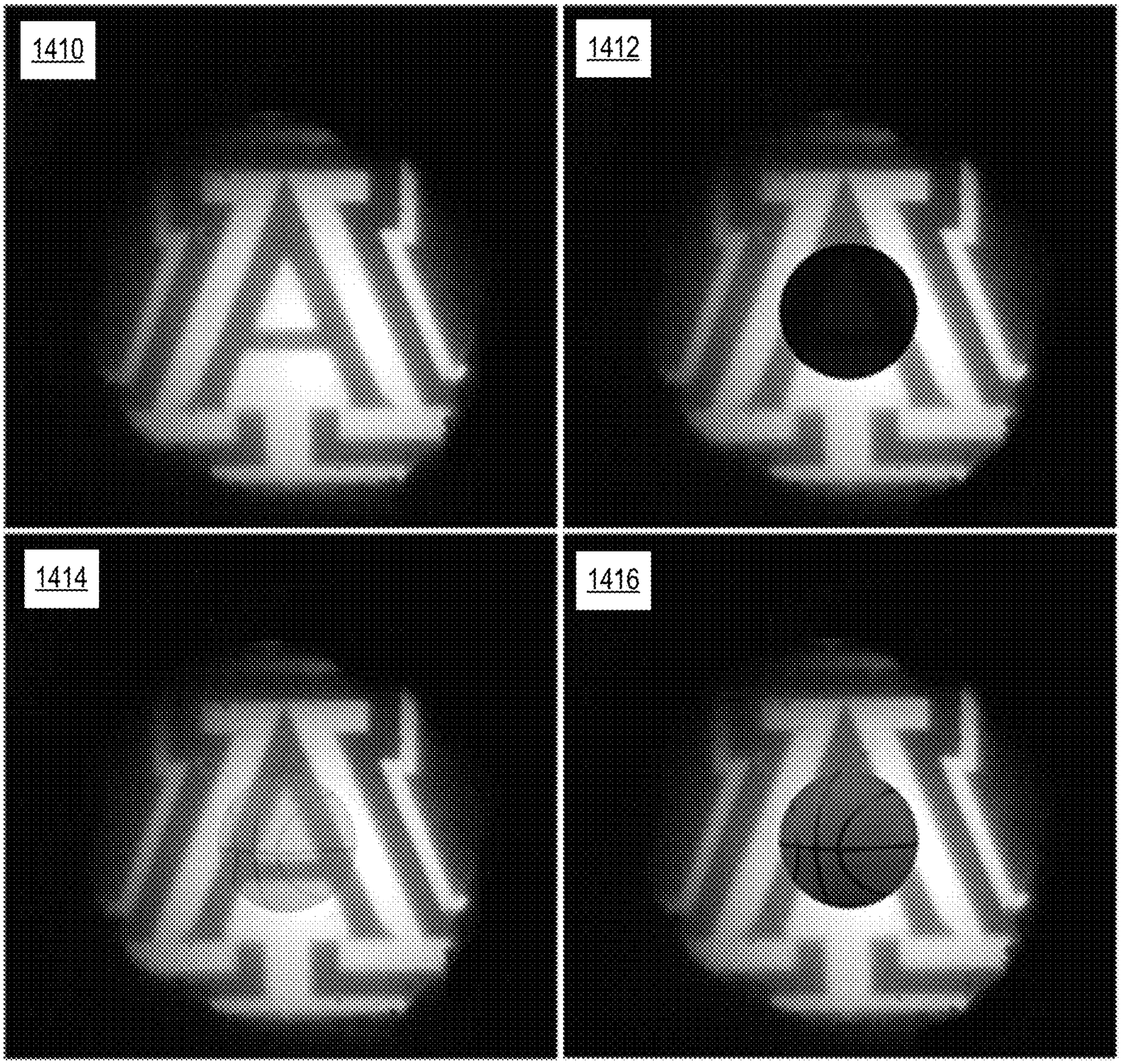
FIG. 14 shows images captured by a camera sensor for a qualitative evaluation of the viewing device of FIG. 9.

FIG. 14 shows images 1410, 1412, 1414, and 1416 captured by camera sensor 1264 of FIG. 12. The aperture of camera sensor 1264 was set to 2.5 mm to match the F/# of the optical system, roughly equivalent to the entrance pupil of a human eye under typical to bright lighting conditions. Image 1410 shows a real-world scene only following light path 1212 with a clear transparency inserted in place of the SLM. Image 1412 shows the real-world scene of image 1410 with a printed occlusion mask inserted in place of the SLM. Image 1414 is an augmented view of the real-world and virtual scenes without the occlusion capability enabled (i.e., a clear transparency with no modulation mask for SLM). The virtual scene was provided by VDM shown in picture 1220. Due to the brightness of the real-world scene (i.e., the logo displayed on the monitor), the basketball appears to be transparent with very little contrast and depth cues provided to the observer. Image 1414 is similar to an image expected when using a typical head-mounted display without occlusion capability. Finally, image 1416 shows a view captured with the printed transparency mask inserted to function as SLM and occlusion enabled with the virtual scene provided by the VDM shown in picture 1220. Image 1416 clearly shows a full occlusion with improved contrast and quality for the virtual basketball.

Figure 15:
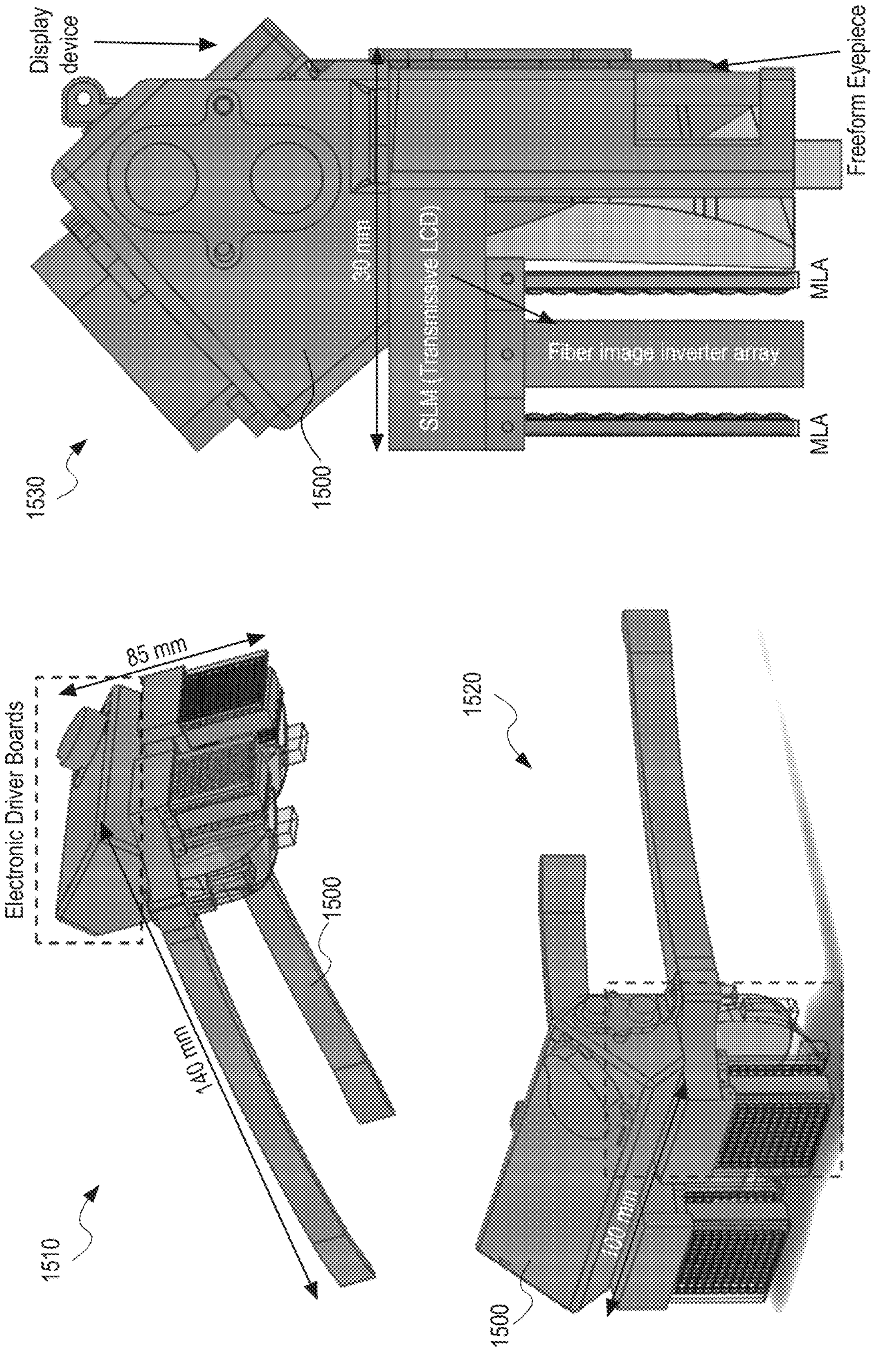
FIG. 15 illustrates three perspective views of an occlusion-capable head-mounted display, in an embodiment.

The experimental design of FIG. 12 may be implemented in an eyewear frame as shown in FIG. 15. FIG. 15 illustrates three perspective views 1510, 1520, and 1530 of an occlusion-capable HMD 1500, which is an embodiment of occlusion-capable HMD 500 of FIG. 5. Perspective views 1510, 1520, and 1530 represent side, front and cross-sectional views, respectively, of a fully assembled occlusion-capable HMD design in a wearable sunglasses form factor. Perspective view 1510, in particular, shows a significantly reduced form factor resulting from the compact light field optical architecture of FIG. 3. The overall height and width of occlusion-capable HMD 1500 are 85 mm by 140 mm, respectively, with a depth of 35 mm and an adjustable intraocular distance that ranges from 60 mm to 80 mm.

Changes may be made in the above methods and systems without departing from the scope of the present embodiments. It should thus be noted that the matter contained in the above description or shown in the accompanying drawings should be interpreted as illustrative and not in a limiting sense. Herein, and unless otherwise indicated the phrase "in embodiments" is equivalent to the phrase "in certain embodiments," and does not refer to all embodiments. The following claims are intended to cover all generic and specific features described herein, as well as all statements of the scope of the present method and system, which, as a matter of language, might be said to fall therebetween.

REFERENCES

[1] M. M. Shah. H. Arshad, and R. Sulaiman. "Occlusion in augmented reality." in 2012 8*th International Conference on Information Science and Digital Content Technology* (*ICIDT*2012). 2012, vol. 2. pp. 372-378.

[2] 0. Cakmakci and J. Rolland, "Head-Worn Displays: A Review," *Journal of Display Technology*, vol. 2, no. 3, pp. 199-216, 2006, [Online]. Available: http://jdt.osa.org/abstract.cfm?URI-jdt-2-3-199.

[3] R. Zhang and H. Hua, "Design of a polarized head-mounted projection display using ferroelectric liquid-crystal-on-silicon microdisplays," Applied Optics, vol. 47, no. 15, pp. 2888-2896, 2008, doi: 10.1364/A0.47.002888.

[4] B. Krajancich, N. Padmanaban, and G. Wetzstein, "Factored Occlusion: Single Spatial Light Modulator Occlusion-capable Optical See-through Augmented Reality Display," *IEEE Transactions on Visualization and Computer Graphics*, vol. 26, no. 5, pp. 1871-1879 May 2020, doi: 10.1109/TVCG.2020.2973443.

[5] H. Hua, C. Gao, L. D. Brown, N. Ahuja, and J. P. Rolland, "A testbed for precise registration, natural occlusion and interaction in an augmented environment using a head-mounted projective display (HMPD)," in *Proceedings IEEE Virtual Reality* 2002, 2002, pp. 81-89. doi: 10.1109/VR.2002.996508.

[6] G. Wetzstein, D. Lanman, M. Hirsch, and R. Raskar, "Tensor Displays: Compressive Light Field Synthesis Using Multilayer Displays with Directional Backlighting," *ACM Trans. Graph*., vol. 31, no. 4, July 2012, doi: 10.1145/2185520.2185576.

[7] A. Maimone and H. Fuchs, "Computational augmented reality eyeglasses," in 2013 *IEEE International Symposium on Mixed and Augmented Reality* (*!SMAR*), 2013, pp. 29-38. doi: 10.1109/ISMAR.2013.6671761.

[8] Y. Itoh, T. Hamasaki, and M. Sugimoto, "Occlusion Leak Compensation for Optical See-Through Displays Using a Single-Layer Transmissive Spatial Light Modulator," *IEEE Transactions on Visualization and Computer Graphics*, vol. 23, no. 11, pp. 2463-2473, 2017, doi: 10.1109/TVCG.2017.2734427.

[9] E. W. Tatham, "Technical Opinion: Getting the Best of Both Real and Virtual Worlds," *Commun. ACM*, vol. 42, no. 9, pp. 96-98, September 1999, doi: 10.1145/315762.315813.

[10] K. Kiyokawa, Y. Kurata, and H. Ohno, "An optical see-through display for mutual occlusion with a real-time stereovision system," *Computers & Graphics*, vol. 25, no. 5, pp. 765-779, 2001, doi: https://doi.org/10.1016/S0097-8493 (01) 00119-4.

[11] I. D. Howlett and Q. Smithwick, "Perspective correct occlusion-capable augmented reality displays using cloaking optics constraints," *Journal of the Society for Information Display*, vol. 25, no. 3, pp. 185-193, March 2017, doi: https://doi.org/10.1002/jsid.545.

[12] K. Kiyokawa, M. Billinghurst, B. Campbell, and E. Woods, "An occlusion capable optical see-through head mount display for supporting co-located collaboration," in *The Second IEEE and ACM International Symposium on Mixed and Augmented Reality,* 2003. *Proceedings.,* 2003, pp. 133-141. doi: 10.1109/ISMAR.2003.1240696.

[13] 0. Cakmakci, Y. Ha, and J. P. Rolland, "A compact optical see-through head-worn display with occlusion support," in *Third IEEE and ACM International Symposium on Mixed and Augmented Reality,* 2004, pp. 16-25. doi: 10.1109/ISMAR.2004.2.

[14] Y. Yamaguchi and Y. Takaki, "See-through integral imaging display with background occlusion capability," Applied Optics, vol. 55, no. 3, pp. A144-A149, 2016, doi: 10.1364/A0.55.00A144.

[15] T. Hamasaki and Y. Itoh, "Varifocal Occlusion for Optical See-Through Head-Mounted Displays using a Slide Occlusion Mask," IEEE Transactions on Visualization and Computer Graphics, vol. 25, no. 5, pp. 1961-1969 May 2019, doi: 10.1109/TVCG.2019.2899249.

[16] K. Rathinavel, G. Wetzstein, and H. Fuchs, "Varifocal Occlusion-Capable Optical See-through Augmented Reality Display based on Focus-tunable Optics," IEEE Transactions on Visualization and Computer Graphics, vol. 25, no. 11, pp. 3125-3134, 2019, doi: 10.1109/TVCG.2019.2933120.

[17] C. Gao, Y. Lin, and H. Hua, "Occlusion capable optical see-through head-mounted display using freeform optics," in 2012 IEEE International Symposium on Mixed and Augmented Reality (ISMAR), 2012, pp. 281-282. doi: 10.1109/ISMAR.2012.6402574.

[18] C. Gao, Y. Lin, and H. Hua, "Optical see-through head-mounted display with occlusion capability," in Proc. SPIE, May 2013, vol. 8735. [Online]. Available: https://doi.org/10.1117/12.2015937.

[19] A. Wilson and H. Hua, "P-220L: Late-News Poster: Demonstration of an Occlusion-Capable Optical See-Through Head-Mounted Display," SID Symposium Digest of Technical Papers, vol. 48, no. 1, pp. 1653-1655 May 2017, doi: https://doi.org/10.1002/sdtp.11958.

[20] A. Wilson, "Mutual Occlusion in Augmented Reality Displays," in Frontiers in Optics (Optical Society of America), 2019, p. paper-FTh3A.2.

[21] A. Wilson and H. Hua, "Design of a Pupil-Matched Occlusion-Capable Optical See-Through Wearable Display," IEEE Transactions on Visualization and Computer Graphics, p. 1, 2021, doi: 10.1109/TVCG.2021.3076069.

[22] A. Wilson and H. Hua, "Design and prototype of an augmented reality display with per-pixel mutual occlusion capability," Optics Express, vol. 25, no. 24, pp. 30539-30549, 2017, doi: 10.1364/0E.25.030539.

[23] D. Cheng, Y. Wang, H. Hua, and M. M. Talha, "Design of an optical see-through head-mounted display with a low f-number and large field of view using a freeform prism," Applied Optics, vol. 48, no. 14, pp. 2655-2668, 2009, doi: 10.1364/A0.48.002655.

[24] H. Hua, X. Hu, and C. Gao, "A high-resolution optical see-through head-mounted display with eyetracking capability," Optics Express, vol. 21, no. 25, pp. 30993-30998, 2013, doi: 10.1364/0E.21.030993.

[25] H. Mukawa et al., "8.4: Distinguished Paper: A Full Color Eyewear Display Using Holographic Planar Waveguides," SID Symposium Digest of Technical Papers, vol. 39, no. 1, pp. 89-92, May 2008, doi: https://doi.org/10.1889/1.3069819.

[26] M. Xu and H. Hua, "Geometrical-lightguide-based head-mounted lightfield displays using polymer-dispersed liquid-crystal films," Optics Express, vol. 28, no. 14, pp. 21165-21181, 2020, doi: 10.1364/0E.397319.

[27] M. Xu and H. Hua, "Integral Imaging Light Field Display Using a Geometrical Lightguide," in Imaging and Applied Optics Congress, 2020, p. DF3A.6. doi: 10.1364/3D.2020.DF3A.6.

What is claimed is:

1. An occlusion-capable viewing device comprising:

an imaging lens, a collimating lens, and a virtual display module, and between the imaging lens and the collimating lens, an image inverter and a spatial light modulator, wherein:

the imaging lens projects a first inverted image of a scene on to an entrance surface of the image inverter;

the image inverter rotates the first inverted image to yield a first upright image;

the spatial light modulator attenuates a first image-region of the first upright image to produce a modulated optical beam;

the collimating lens collimates the modulated optical beam to yield a collimated optical beam; and the virtual display module includes a display device and a light combiner, which combines (i) the collimated optical beam and (ii) illumination emitted by the display device to yield an occluded image.

2. The occlusion-capable viewing device of claim 1, the imaging lens and the collimating lens being coaxial.

3. The occlusion-capable viewing device of claim 1, the display device being optically coupled to the light combiner.

4. The occlusion-capable viewing device of claim 1, the image inverter being a fiber faceplate inverter.

5. The occlusion-capable viewing device of claim 1, the spatial light modulator including a liquid crystal display.

6. The occlusion-capable viewing device of claim 1, the first image-region being of a scene-region of the scene, the imaging lens, the image inverter, and the collimating lens constituting a first optics unit, and further comprising a second optics unit that (i) includes a second imaging lens, a second image inverter, and a second collimating lens, and (ii) is laterally displaced from and parallel to the first optics unit, wherein:

the second imaging lens projects a second inverted image of the scene on to an entrance surface of the second image inverter;

the second image inverter rotates the second inverted image to yield a second upright image;

the spatial light modulator further attenuates a second image-region of the second upright image to produce a second modulated optical beam, the second image-region being of the scene-region;

the second collimating lens collimates the second modulated optical beam to yield a second collimated optical beam; and the light combiner further combines (i) the second collimated optical beam and (ii) the illumination emitted by the display device to yield the occluded image.

7. The occlusion-capable viewing device of claim 6, optical axes of the imaging lens and the second imaging lens being parallel.

8. The occlusion-capable viewing device of claim 6, principal planes of the imaging lens and the second imaging lens being coplanar.

9. The occlusion-capable viewing device of claim 6, optical axes of the collimating lens and the second collimating lens being parallel.

10. The occlusion-capable viewing device of claim 6, principal planes of the collimating lens and the second collimating lens being coplanar.

11. The occlusion-capable viewing device of claim 6, further comprising a third optics unit, including a third imaging lens, a third image inverter, and a third collimating lens, laterally displaced from, and parallel to the first and second optics units, such that the first, second, and third optics units form a two-dimensional array of optics units, wherein:

the third imaging lens projects a third inverted image of the scene on to an entrance surface of the third image inverter;

the third image inverter rotates the third inverted image to yield a third upright image;

the spatial light modulator further attenuates a third image-region of the third upright image to produce a third modulated optical beam, the third image-region being of the scene-region;

the third collimating lens collimates the third modulated optical beam to yield a third collimated optical beam; and the light combiner further combines (i) the third collimated optical beam and (ii) the illumination emitted by the display device to yield the occluded image.

12. The occlusion-capable viewing device of claim 11, optical axes of the imaging lens, the second imaging lens, and the third imaging lens being parallel.

13. The occlusion-capable viewing device of claim 11, principal planes of the imaging lens, the second imaging lens, and the third imaging lens being coplanar.

14. The occlusion-capable viewing device of claim 11, optical axes of the collimating lens, the second collimating lens, and the third collimating lens being parallel.

15. The occlusion-capable viewing device of claim 11, principal planes of the collimating lens, the second collimating lens, and the third collimating lens being coplanar.

16. An occlusion-capable head-mounted display, comprising:

an eyewear frame; and the occlusion-capable viewing device of claim 1, attached to the eyewear frame.

17. The occlusion-capable head-mounted display of claim 16, the eyewear frame including one of a visor, eyeglasses, data glasses, a helmet, and a headset.

18. A method for producing an occluded image, comprising:

projecting an inverted image of a scene onto an entrance surface of an image inverter;

rotating the inverted image to yield an upright image;

attenuating an image-region of the upright image to produce a modulated optical beam;

collimating the modulated optical beam to yield a collimated optical beam; and combining (i) the collimated optical beam and (ii) an illumination emitted by a display device to yield the occluded image.

19. The method of claim 18, further comprising:

projecting an additional inverted image of the scene onto an entrance surface of an additional image inverter;

rotating the additional inverted image to yield an additional upright image;

further attenuating an additional image-region of the additional upright image to produce the modulated optical beam;

collimating the modulated optical beam to yield an additional collimated optical beam; and further combining (i) the additional collimated optical beam and (ii) the illumination emitted by the display device to yield the occluded image.

* * * * *